United States Patent
Chalamala et al.

(10) Patent No.: US 10,762,662 B2
(45) Date of Patent: Sep. 1, 2020

(54) CONTEXT BASED POSITION ESTIMATION OF TARGET OF INTEREST IN VIDEOS

(71) Applicant: Tata Consultancy Services Limited, Mumbai (IN)

(72) Inventors: Srinivasa Rao Chalamala, Hyderabad (IN); Balakrishna Gudla, Hyderabad (IN); Krishna Rao Kakkirala, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 71 days.

(21) Appl. No.: 16/299,365

(22) Filed: Mar. 12, 2019

(65) Prior Publication Data

US 2019/0287264 A1   Sep. 19, 2019

(30) Foreign Application Priority Data

Mar. 14, 2018 (IN) .............................. 201821009436

(51) Int. Cl.
*G06K 9/00* (2006.01)
*G06T 7/73* (2017.01)
(Continued)

(52) U.S. Cl.
CPC .............. *G06T 7/74* (2017.01); *G06K 9/628* (2013.01); *G06K 9/6228* (2013.01);
(Continued)

(58) Field of Classification Search
CPC .......... G06T 7/74; G06T 7/20; G06K 9/6228; G06K 9/6232; G06K 9/628;
(Continued)

(56) References Cited

U.S. PATENT DOCUMENTS 10,706,542 B2 *   7/2020   Chefd'hotel ......... G06N 3/0454
2017/0124409 A1 *   5/2017   Choi .................... G06N 3/0454
(Continued)

FOREIGN PATENT DOCUMENTS

CN       106951867       7/2017
WO   WO-2014/205231   12/2014

*Primary Examiner* — Gabriel I Garcia
(74) *Attorney, Agent, or Firm* — Finnegan, Henderson, Farabow, Garrett & Dunner, LLP

(57) ABSTRACT

Target tracking in a video is a highly challenging problem as the target may be effected by its appearance changes along the video, partial occlusions, background clutter, illumination variations, surrounding environment and also due to changes in the motion of the target. Embodiments of the present disclosure address this problem by implementing neural network for convolution feature maps and their gradient maps generation. The proposed two-class neural network (TCNN) is guided by feeding it target of interest defined by a bounding box in a first frame of the video. With this target guidance TCNN generates target activation map by using convolutional features and gradient maps. Target activation map gives tentative location of target, and this is further exploited to locate target precisely by using correlation filter(s) and peak location estimator based on identified context. This process repeats for every frame of the video to track the target accurately.

15 Claims, 11 Drawing Sheets

(51) Int. Cl.
 G06K 9/62 (2006.01)
 G06T 7/20 (2017.01)
(52) U.S. Cl.
 CPC .............. G06K 9/6232 (2013.01); G06T 7/20 (2013.01); *G06K 2209/21* (2013.01); *G06T 2207/10016* (2013.01); *G06T 2207/20004* (2013.01); *G06T 2207/20084* (2013.01)
(58) Field of Classification Search
 CPC ..... G06K 2209/21; G06K 2209/10016; G06K 2209/20004; G06K 2209/20084
 USPC ......................................................... 382/103
 See application file for complete search history.

(56) References Cited

U.S. PATENT DOCUMENTS

| | | | |
|---|---|---|---|
| 2018/0129934 A1* | 5/2018 | Tao | G06N 3/0454 |
| 2018/0165548 A1* | 6/2018 | Wang | G06N 3/0454 |
| 2018/0341872 A1* | 11/2018 | Wang | G06T 7/11 |
| 2019/0042850 A1* | 2/2019 | Jones | G06K 9/00711 |
| 2019/0147220 A1* | 5/2019 | McCormac | G06K 9/6277 382/103 |
| 2020/0026987 A1* | 1/2020 | Gudla | G06F 17/16 |

* cited by examiner

CONTEXT BASED POSITION ESTIMATION OF TARGET OF INTEREST IN VIDEOS

PRIORITY CLAIM

This U.S. patent application claims priority under 35 U.S.C. § 119 to: India Application No. 201821009436, filed on Mar. 14, 2018. The entire contents of the aforementioned application are incorporated herein by reference.

TECHNICAL FIELD

The disclosure herein generally relates to position estimation of targets, and, more particularly, to context based position estimation of target of interest in videos.

BACKGROUND

Target (or object) tracking in a video is a highly challenging problem as the target may be effected by its appearance changes along the video, partial occlusions, background clutter, illumination variations, surrounding environment and also due to changes in the motion of the target. The appearance changes are scale (resolution) changes and view changes due to a relative position of a camera concerning the target. Current conventional approaches are not sufficient and efficient in terms of tracking targets that are of interest.

SUMMARY

Embodiments of the present disclosure present technological improvements as solutions to one or more of the above-mentioned technical problems recognized by the inventors in conventional systems. For example, in one aspect, there is provided a processor implemented method for context based position estimation of target of interest in videos. The method comprising: receiving, at a two-class neural network, a target of interest from a frame of a video to generate a score and a class label, wherein the score and class label are generated using a classifier of the two-class neural network, the classifier comprising a first class, and a second class, wherein the first class is specific to one or more targets and the second class is specific to one or more non-targets; receiving, at a first part of the two-class neural network, a subsequent frame of the video to generate one or more convolutional feature maps; computing, by a cost function, a cost value based on the class label and the score, wherein the cost value is computed at the first part of the neural network, a second part of the neural network, and a softmax layer of the neural network, and wherein the cost value is associated with each of the generated one or more convolutional feature maps; computing one or more gradient maps based on the score, the class label specific to the frame and the generated one or more convolutional feature maps, wherein the one or more gradient maps are computed for each frame until a last frame of the video using the class label specific to the frame that is computed using the two-class neural network; generating, one or more target activation maps, using the one or more gradient maps and the generated one or more convolutional feature maps; identifying, a tentative location of the target of interest based on the one or more target activation maps, and context associated thereof; estimating, by using a peak location estimator, a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video. In an embodiment, the step of estimating, by using a peak location estimator, a position of the target using the tentative location comprises: extracting one or more patches from neighborhood of a tentative location in the one or more target activation maps; computing, by using a pre-trained correlation filter, a correlation map based on the extracted patch; and estimating the position of the target based on the correlation map. In an embodiment, the step of computing one or more gradient maps may comprises performing a derivation on the cost value associated with each of the generated one or more convolutional feature maps.

In an embodiment, the step of generating, one or more target activation maps may comprise: up-sampling the generated one or more convolutional feature maps to an input image size; performing a pooling over each of the one more gradient maps to generate a real value ($\alpha$) from each of the one or more gradient maps and obtain a set of real values ($\alpha$); and generating the one or more target activation maps based on the set of real values and the up-sampled one or more convolutional feature maps.

In an embodiment, one or more parameters of a correlation filter of the two-class neural network are continually updated based on at least one of the context associated with the target of interest, and view and change in position of the target of interest in one or more frames of the video. On the other hand, the correlation filter enables learning of parameters of the correlation filter based on input in such a way that resultant output should have a maximum response at the position where the target exists in the input frame. In an embodiment of the present disclosure, the correlation filter is trained based on the identified peak value and at least one of a corresponding patch (and/or multiple patches) or one or more features extracted from the corresponding patch (and/or multiple patches), and one or more parameters pertaining to the correlation filter 504 are updated accordingly. In an embodiment of the present disclosure, the one or more features that are extracted may comprise but are not limited to, invariant features, for example, SIFT (Scale Invariant Feature Transform), Histogram of oriented gradients (HOG) features, Hu-moment features, SURF (Speed Up Robust Features), edges, color, hue, saturation, etc. In an embodiment, the one or more parameters comprise weights values, and the like. If the input patch size is say, 100×100, then the weight values will be 100×100, in an example embodiment.

In another aspect, there is provided a system for context based position estimation of target of interest in videos. The system comprising: a memory storing instructions; one or more communication interfaces; and one or more hardware processors coupled to the memory via the one or more communication interfaces, wherein the one or more hardware processors are configured by the instructions to: receive, at a two-class neural network, a target of interest from a frame of a video to generate a score and a class label, wherein the score and class label are generated using a classifier of the two-class neural network, the classifier comprising a first class, and a second class, wherein the first class is specific to one or more targets and the second class is specific to one or more non-targets; receive, at a first part of the neural network, a subsequent frame of the video to generate one or more convolutional feature maps; compute, by a cost function, a cost value based on the class label and the score, wherein the cost value is computed at the first part of the neural network, a second part of the neural network, and a softmax layer of the neural network, and wherein the cost value is associated with each of the generated one or more convolutional feature maps; compute one or more gradient maps based on the score, the class label specific to the frame and the generated one or more convolutional feature maps; generate, one or more target activation maps, using the one or more gradient maps and the generated one or more convolutional feature maps; identify, a tentative location of the target of interest based on the one or more target activation maps, and context associated thereof; estimate, by using a peak location estimator, a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video.

In an embodiment, the one or more gradient maps are computed by performing a derivation on the cost value and the class label associated with each of the generated one or more convolutional feature maps.

In an embodiment, the one or more target activation maps are generated by: up-sampling the generated one or more convolutional feature maps to an input image size; performing a pooling over each of the one more gradient maps to generate a real value ($\alpha$) from each of the one or more gradient maps and obtain a set of real values ($\alpha$); and generating the one or more target activation maps based on the set of real values and the up-sampled one or more convolutional feature maps.

In an embodiment, the position of the target is estimated using the tentative location by: extracting one or more patches from neighborhood of a tentative location in the one or more target activation maps; computing, by using a pre-trained correlation filter, a correlation map based on the extracted patch; and estimating the position of the target based on the correlation map.

In an embodiment, one or more parameters of a correlation filter of the two-class neural network are continually updated based on at least one of the context associated with the target of interest, and view and change in position of the target of interest in one or more frames of the video.

In yet another aspect, there is provided one or more non-transitory machine readable information storage mediums comprising one or more instructions which when executed by one or more hardware processors causes: receiving, at a two-class neural network, a target of interest from a frame of a video to generate a score and a class label, wherein the score and class label are generated using a classifier of the two-class neural network, the classifier comprising a first class, and a second class, wherein the first class is specific to one or more targets and the second class is specific to one or more non-targets; receiving, at a first part of the two-class neural network, a subsequent frame of the video to generate one or more convolutional feature maps; computing, by a cost function, a cost value based on the class label and the score, wherein the cost value is computed at the first part of the neural network, a second part of the neural network, and a softmax layer of the neural network, and wherein the cost value is associated with each of the generated one or more convolutional feature maps; computing one or more gradient maps based on the score, the class label specific to the frame and the generated one or more convolutional feature maps, wherein the one or more gradient maps are computed for each frame until a last frame of the video using the class label specific to the frame that is computed using the two-class neural network; generating, one or more target activation maps, using the one or more gradient maps and the generated one or more convolutional feature maps; identifying, a tentative location of the target of interest based on the one or more target activation maps, and context associated thereof; estimating, by using a peak location estimator, a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video.

In an embodiment, the step of estimating, by using a peak location estimator, a position of the target using the tentative location comprises: extracting one or more patches from neighborhood of a tentative location in the one or more target activation maps; computing, by using a pre-trained correlation filter, a correlation map based on the extracted patch; and estimating the position of the target based on the correlation map.

In an embodiment, the step of computing one or more gradient maps may comprises performing a derivation on the cost value (and optionally the class label) associated with each of the generated one or more convolutional feature maps.

In an embodiment, the step of generating, one or more target activation maps may comprise: up-sampling the generated one or more convolutional feature maps to an input image size; performing a pooling over each of the one more gradient maps to generate a real value ($\alpha$) from each of the one or more gradient maps and obtain a set of real values ($\alpha$); and generating the one or more target activation maps based on the set of real values and the up-sampled one or more convolutional feature maps.

In an embodiment, the instructions further cause to continually update one or more parameters of a correlation filter of the two-class neural network based on at least one of the context associated with the target of interest, and view and change in position of the target of interest in one or more frames of the video.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
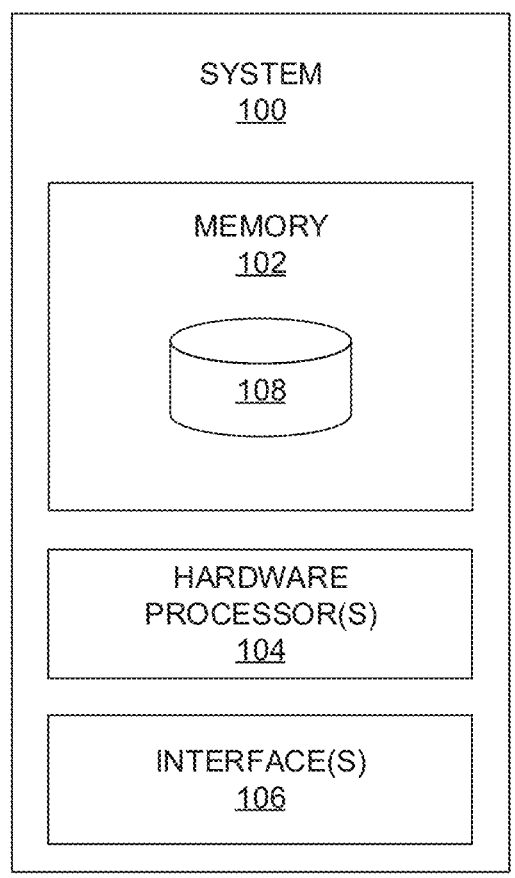
FIG. 1 illustrates an exemplary block diagram of a system for context based position estimation of target object of interest in videos, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Target (or object) tracking in a video is a highly challenging problem as the target may be effected by its appearance changes along the video, partial occlusions, background clutter, illumination variations, surrounding environment and also due to changes in the motion of the target. The appearance changes are scale (resolution) changes and view changes due to a relative position of a camera concerning the target. Current conventional approaches are not sufficient and efficient in terms of tracking targets that are of interest.

State of the art predicts the location of a target in the frame with the help of correlation filter either on handcrafted or machine-crafted features (deep neural network) from the patch of interest (PoI) or target of interest (ToI) rather than the full frame. The PoI is a sub-image extracted from the current frame by using the location of the target last known in the previous frame along with few surrounding pixels on either direction considering that there is no significant motion in the target. These methods fail in tracking the target when the target is out of the patch, this occurs when the target is moving at a higher speed. Also, these approaches lead the tracker to follow in an incorrect trajectory, if the location of the target is false in the previous frame as these methods use location information from the prior frames for tracking. Embodiments of the present disclosure alleviate the issues above by using the target patch as a guide rather than using it for localizing the target in subsequent frames. In an embodiment of the present disclosure, target patch is a sub image that is extracted from the surrounding region of the location from the input image. This method also eliminates the effect due to the high motion of the target as this predicts the location of the target from the whole image rather than the patch of interest. Also, missing tracking problem is overcome by accurately predicting the location of the target in successive frames.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 illustrates an exemplary block diagram of a system 100 for context based position estimation of target object of interest in videos, in accordance with an embodiment of the present disclosure. In an embodiment, the system 100 includes one or more hardware processors 104, communication interface device(s) or input/output (I/O) interface(s) 106, and one or more data storage devices or memory 102 operatively coupled to the one or more hardware processors 104. The one or more hardware processors 104 that are hardware processors can be implemented as one or more microprocessors, microcomputers, microcontrollers, digital signal processors, central processing units, state machines, graphics controllers, logic circuitries, Graphics processing units (GPUs), hardware accelerators, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102. The memory 102 may further comprise a database 108 that may store image(s) and/or video frames under consideration for position estimation of target object of interest based on identified context associated thereof.

In an embodiment, the system 100 includes one or more data storage devices or memory 102 operatively coupled to the one or more hardware processors 104 and is configured to store instructions configured for execution of steps of the method (of FIG. 6) by the one or more processors 104.

Figure 2:
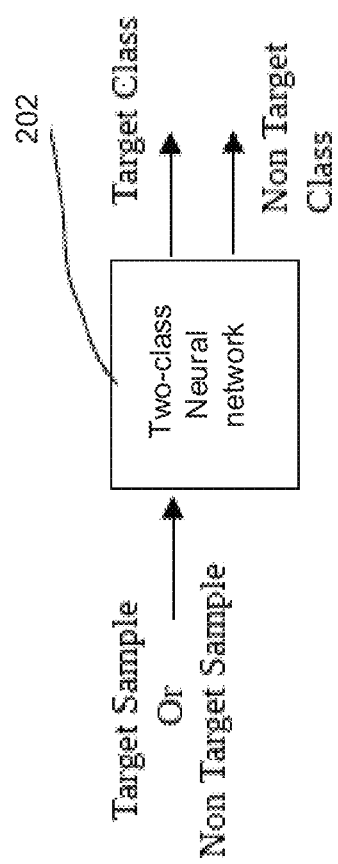
FIG. 2 is a block diagram of a neural network depicting an initial training phase in an accordance with an embodiment of the present disclosure.

FIG. 2, with reference to FIG. 1, is a block diagram of a neural network depicting an initial training phase in an accordance with an embodiment of the present disclosure. More specifically, FIG. 2 depicts one or more target (e.g., target of interest) samples, and non-target samples (e.g., non-targets) are fed to a two-class neural network 202 (also referred herein as 'neural network 202 or TCNN 202 or two-class convolutional deep neural network 202) to generate one or more class labels. In an embodiment of the present disclosure, a deep neural network comprises of a combination of convolutional layers, fully connected layers and a softmax layer for the classification task. During training, the network adjusts its parameters to label an input image with its class. The parameters of the network is called as a model. For instance, as can be seen for each target of interest fed as an input, the neural network generates a class label or alternatively identifies a class label from the previously generated class label, if the target under consideration in the neural network has been previously processed for class label identification. Similarly, the neural network is fed with an input (e.g., one or more non-targets) wherein the neural network generates a non-class label or alternatively identifies a non-class label from the previously generated class label, if the target under consideration in the neural network has been previously processed for non-class label identification. By doing so, the system 100 enables effective tracking of target(s) by using the approach of FIG. 2 and FIG. 3 (described in later sections). The system 100 and the methodology described herein uses deep-learning and correlation based techniques with two phases such as the initial training phase as depicted in FIG. 2, and target location estimation phase as depicted in FIG. 3.

The initial training phase consists of a two-class convolutional deep neural network (Conv_Net) with several layers of convolutional, fully connected, and softmax layers and is trained such that the neural network can learn the difference between the target and the non-target information from the input. Out of two classes, the target is one class, and non-target is another class. The objective of the initial training phase as shown in FIG. 2 is to generate an initial model (parameters and hyper parameters of the Conv_Net having the ability to classify the target and non-target efficiently, and further be able to generate one or more target specific features rather than an object specific features as target may comprises of variety of objects (e.g., bike rider has objects like human, bike, helmet etc.). This neural network produces a score (cost) and the class label of the input.

Figure 3:
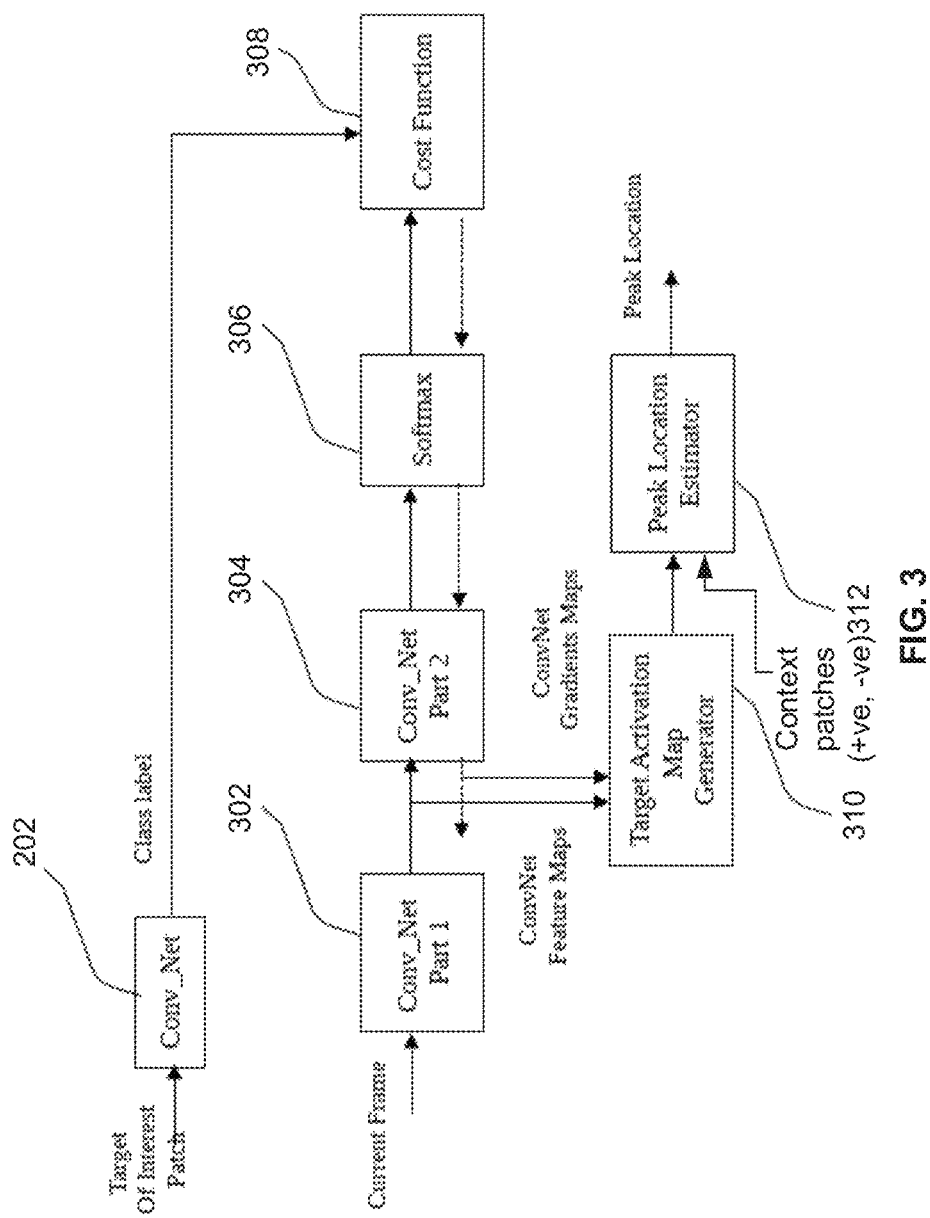
FIG. 3 is a high level block diagram of the neural network illustrating key stages in a processor implemented method for context based position estimation of target object of interest in video in accordance with an embodiment of the present disclosure.
Figure 4:
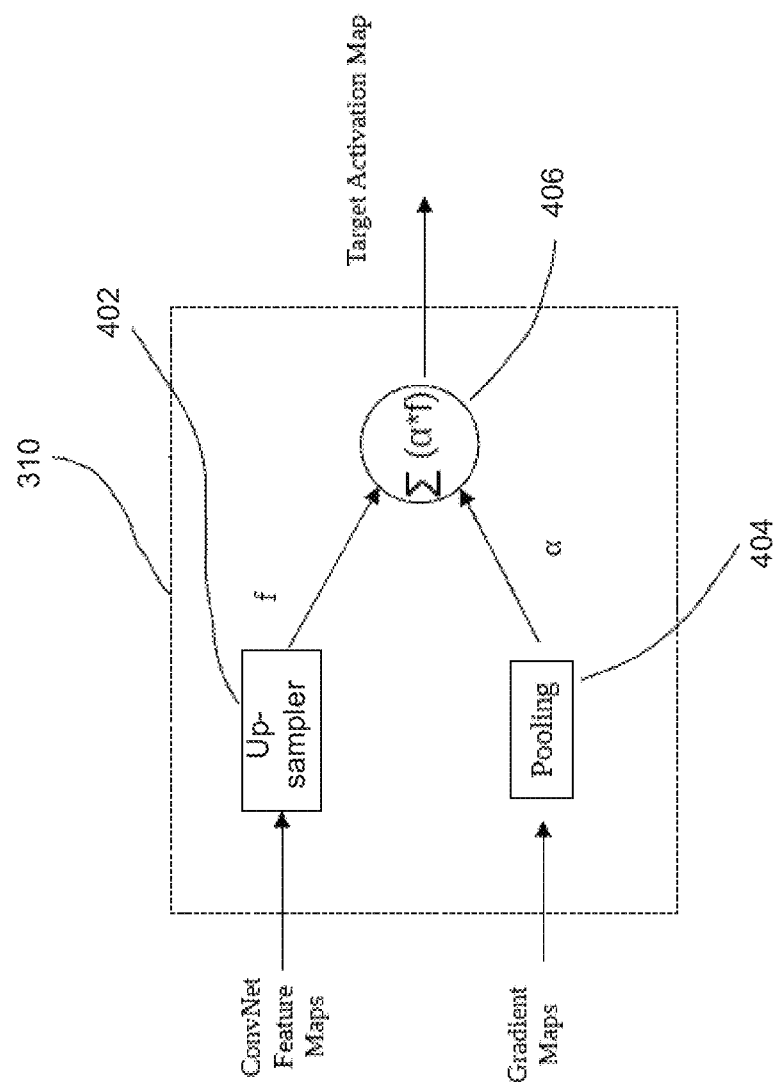
FIG. 4 is an exemplary block diagram of a target activation map generator illustrating key stages in a processor implemented method for generating one or more target activation maps for facilitating identification of tentative location of target object of interest in video based on identified context associated thereof, in accordance with an embodiment of the present disclosure.
Figure 5:
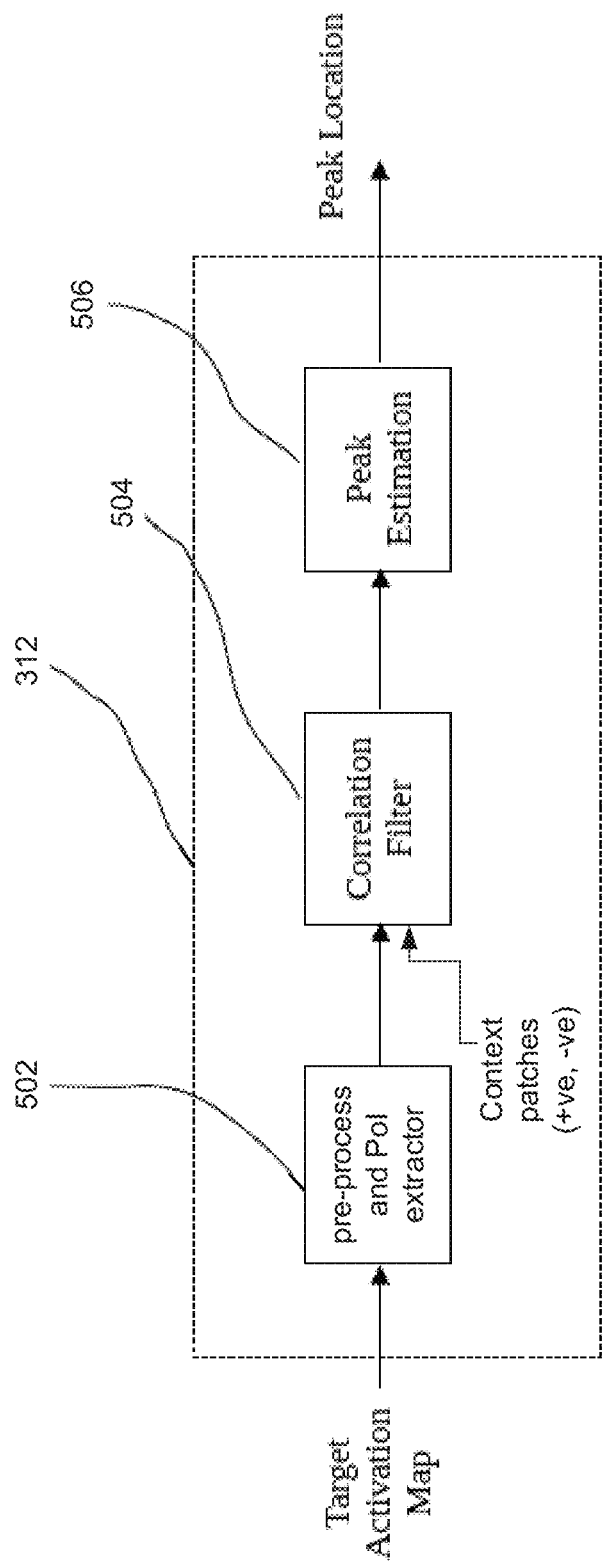
FIG. 5 is an exemplary block diagram of a peak location estimator illustrating key stages in a processor implemented method for estimating a position of the target object of interest in videos in accordance with an embodiment of the present disclosure.
Figure 6A:
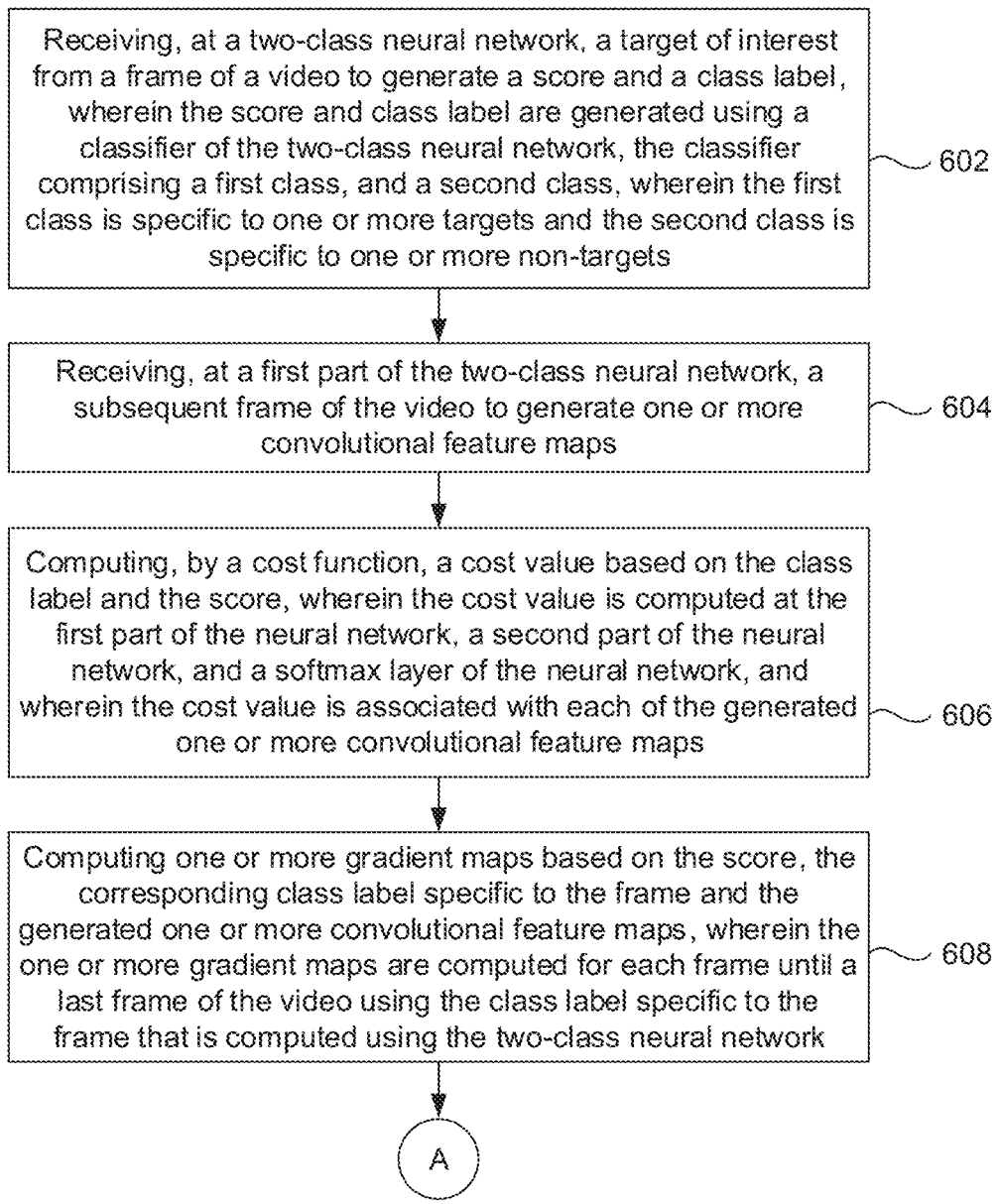
FIG. 6A through 6B is an exemplary flow diagram illustrating a computer/processor implemented method for context based position estimation of target object of interest in videos in accordance with an embodiment of the present disclosure.
Figure 6B:
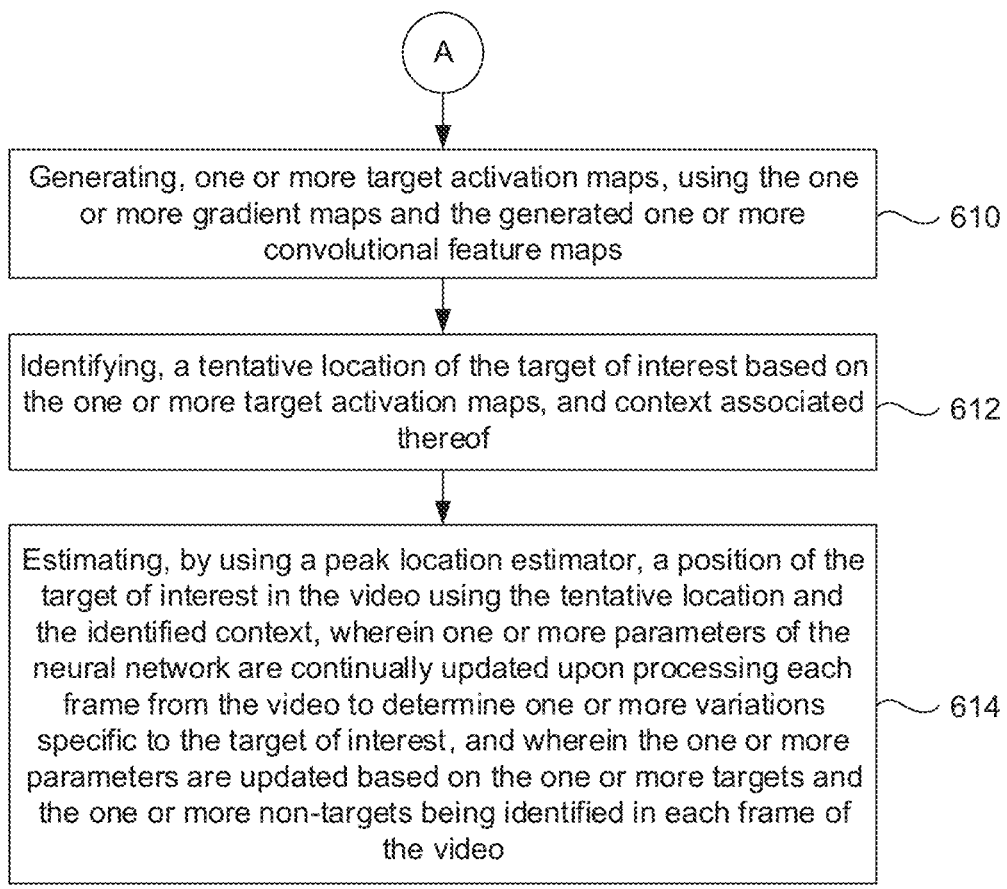

FIG. 3, with reference to FIGS. 1-2, is a high level block diagram of the neural network 202 illustrating key stages in a processor implemented method for context based position estimation of target object of interest in video in accordance with an embodiment of the present disclosure. FIG. 4, with reference to FIGS. 1-3, is an exemplary block diagram of a target activation map generator illustrating key stages in a processor implemented method for generating one or more target activation maps for facilitating identification of tentative location of target object of interest in video based on identified context associated thereof, in accordance with an embodiment of the present disclosure. FIG. 5, with reference to FIGS. 1 through 4, is an exemplary block diagram of a peak location estimator illustrating key stages in a computer/processor implemented method for estimating a position of the target object of interest in videos in accordance with an embodiment of the present disclosure. FIG. 6A through 6B, with reference to FIGS. 1 through 5, is an exemplary flow diagram illustrating a computer/processor implemented method for context based position estimation of target object of interest in videos in accordance with an embodiment of the present disclosure. The steps of the method will now be explained in detail with reference to components of the system 100 of FIG. 1 and the key stages depicted in FIGS. 2 through 5. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment of the present disclosure, at step 602, the one or more hardware processors 104 are configured to receive via the two-class neural network 202, a target of interest from a frame (e.g., a first frame or a current frame) of a video to generate a score and a class label, wherein the score and class label are generated using a classifier of a neural network as depicted in FIG. 2, the classifier comprising a first class, and a second class, wherein the first class is specific to one or more targets and the second class is specific to one or more non-targets.

In an embodiment of the present disclosure, at step 604, the one or more hardware processors 104 are configured to receive, at a first part 302 of the neural network 202, a subsequent frame of the video to generate one or more convolutional feature maps. In an embodiment, the one or more convolution feature maps are generated for each frame until a last frame of the video. In an embodiment of the present disclosure, at step 606, the one or more hardware processors 104 are configured to compute, via a cost function block 308, a cost value based on the class label and the score. In an embodiment, the cost value is computed at the first part 302 of the neural network 202, a second part 304 of the neural network 202, and a softmax layer 306 of the neural network 202 wherein the cost value is associated with each of the generated one or more convolutional feature maps. Cost is the probability value (score) obtained at output of the network during a forward pass. In a forward pass, an input image undergoes few convolutional operations and transformations with the model parameters, in an example embodiment. In an embodiment of the present disclosure, at step 608, the one or more hardware processors 104 compute one or more target guided gradient maps based on the score, the class label and the generated one or more convolutional feature maps. In an embodiment of the present disclosure, the one or more target guided gradient maps are computed based on the score, the class label specific to the frame and the generated one or more convolutional feature maps, wherein the one or more gradient maps are computed for each frame until a last frame of the video using the class label specific to the frame that is computed using the two-class neural network. In other words, the class label that was computed earlier (see step 602) using the two class neural network is used to compute the one or more target guided gradient maps for every frame rather than computing class label from the target of interest of a previous frame as this network. This is done because the neural network has only two classes and target always belongs to true class. Therefore, when compared with existing (conventional) approaches and systems wherein class label is computed for every frame in the conventional approaches and systems, the embodiments of the present disclosure utilize the class label generated at step 602 to generate target guided gradient maps thus making the processing faster as it does not require to generate a separate class label for each frame. Further, computing class label for every frame as seen in the conventional approaches and systems will require additional processing time leading to memory consumption and overhead. On the contrary, since the embodiments of the present disclosure utilize the same class label generated at step 602 to generate target guided gradient maps, this eliminates the need of additional processing time, power, and memory consumption thus making the system 100 more efficient in terms of processing information and system's resources utilization.

In an embodiment of the present disclosure, the step of computing one or more target guided gradient maps comprises performing a derivation on the cost value and the class label associated with each of the generated one or more convolutional feature maps. In other words, target guided gradient maps are computed by performing the derivation over the score of a desired object with respect to the feature maps of the corresponding convolutional layer. In an embodiment of the present disclosure, target location estimation phase as depicted in FIG. 3 is an online model to predict the location of the target, and intern update weights of components of the neural network 202 to learn the target specific features, and its new appearance over time. Initially, blocks from 202 to 306 of FIG. 3 are initialized with the parameters that were obtained during the initial training phase from FIG. 2. The neural network 202 in FIG. 3 is inputted with target of interest from earlier video frame to generate a score as well as a class label. This information is passed to the cost function 310 for computing target guided gradient maps (gm) rather than computing them based on the obtained cost by blocks 304, 306 and 308 of FIG. 3 from the current frame or the full image. On the other hand, current frame is fed as input to the block 302 to generate convolutional feature maps (Ak). Target guided gradient maps are computed (or generated) with the help of these convolutional feature maps and the previously calculated cost and the class label as given in following expression below:

$$gm = \frac{df_c}{d(A^k)}$$

As can be seen from above expression, these target guided gradient maps are obtained by performing the derivation on the cost with respect to each convolution feature maps. The size of the gradient maps is the same as the convolutional feature maps at that layer. $f_c$ in the above expression is the loss function at the class label, wherein a derivation on $f_c$ is performed with respect to each feature map $A^k$ to get corresponding gradient map. For example, if $x^2$ is function $f$, x is one of the feature map, then:

$$\frac{df}{dx} = \frac{dx^2}{dx} = 2x.$$

Now 2x becomes the gradient map (reference from https://theclevermachine.wordpress.com/2014/09/06/derivation-error-backpropagation-gradient-descent-for-neural-networks/ for more information).

In an embodiment of the present disclosure, at step 610, the one or more hardware processors 104 generate, via a target activation map generator 310, one or more target activation maps, using the one or more target guided gradient maps and the generated one or more convolutional feature maps. In an embodiment of the present disclosure, the activation maps are defined as a heat map consisting of highlighted region of the target while diminishing the impact of the non-target region.

In an embodiment, the step of generating, one or more target activation maps comprises: up-sampling, using an up-sampler 402, the generated one or more convolutional feature maps to an input image size; performing, using a pooling unit 404, a pooling (e.g., max pooling, average pooling, etc.) over each of the one more gradient maps to generate a real value ($\alpha$) (e.g., value of '$\alpha$' ranges from 0.1 to 100 and is subject to case under scenario) from each of the one or more gradient maps and obtain a set of real values ($\alpha$); and generating the one or more target activation maps based on the set of real values and the up-sampled one or more convolutional feature maps. In an embodiment, the output from each of the up-sampler unit 402 and the pooling unit 404 are fed to a multiplier 406 of the target activation map generator 310, wherein the multiplier 406 is configured to use the output generated by both the resampling unit 402 and pooling unit 404 to generate the one or more target activation maps.

In an embodiment of the present disclosure, at step 612, the one or more hardware processors 104 identify, (i) a tentative location of the target of interest based on the one or more target activation maps, and (ii) identified context associated thereof. For instance, in the present disclosure, the identified context comprises a spatial context and/or a temporal context.

In an embodiment of the present disclosure, a negative spatial context can be identified as region excluding target region in the full frame, so that region can be cropped into number of negative samples (e.g., non-target region(s)) to train the neural network 202. Upon such training, the neural network will be capable of understanding more clearly what is target region and what is non-target region through learning based on target and non-target classes and corresponding inputs where target region is labeled as target class and non-target region (e.g., negative context) region is labeled as non-target class. Thus, target activation maps will be improved.

In an embodiment of the present disclosure, at step 614, the one or more hardware processors 104 estimate, by using a peak location estimator 312, a position of the target of interest in the video using the tentative location and the identified context associated thereof. In an embodiment of the present disclosure, the step of estimating, by using the peak location estimator 312, a position of the target using the tentative location comprises: extracting, using a patch of interest (PoI) extractor 502 (also referred as "pre-process, and patch of interest (PoI) extractor 502"), one or more patches from neighborhood of a tentative location in the one or more target activation maps; computing, by using a correlation filter 504 (also referred as a pre-trained correlation filter 504), a correlation map based on the extracted one or more patches; and estimating the position of the target based on the correlation map using a peak estimator 506. In an embodiment, a peak value is identified based on the correlation filter response generated for each frame and the position of the target object is estimated based on the identified peak value in the correlation filter response for each frame.

In an embodiment of the present disclosure, one or more parameters of the neural network are continually updated upon processing each frame from the video to determine one or more variations specific to the target of interest. The one or more parameters are updated based on the one or more targets and the one or more non-targets being identified in each frame of the video, in one example embodiment.

In an embodiment of the present disclosure, one or more parameters of the correlation filters are continually updated based on at least one of the context associated with the target of interest, and view and change in position of the target of interest in one or more frames of the video. This enables the correlation filter to be trained based on the context associated with the target of interest, and view and change in position of the target of interest in one or more frames of the video. Further, the correlation filter and its parameters are updated using negative context patches (or non-target patches) and target (positive context) patches (as can be seen in FIG. 3 and FIG. 5) such that it give peak response where target region is present and gives minimal (or no) response where non-target region is present. In an embodiment of the present disclosure, the correlation filter is a set of parameters that are learned based on input target images with different spatial transformations and corresponding Gaussian maps (having the peak at a location of the target in an input image) such that it produces a correlation map having an acme at the position of the target in the input image.

With reference to FIG. 3, arrows depicting forward pass or arrows represented in solid line horizontally indicate that in the forward pass, inputs are processed (multiplication or summation) with corresponding weights (or parameters) and move forward to next block. Similarly, arrows depicting backward pass or arrows represented in dotted line horizontally indicate that in the backward pass the neural network derives the partial derivatives of the cost function with respect to block 202 via blocks 304 and 206.

Figure 7:
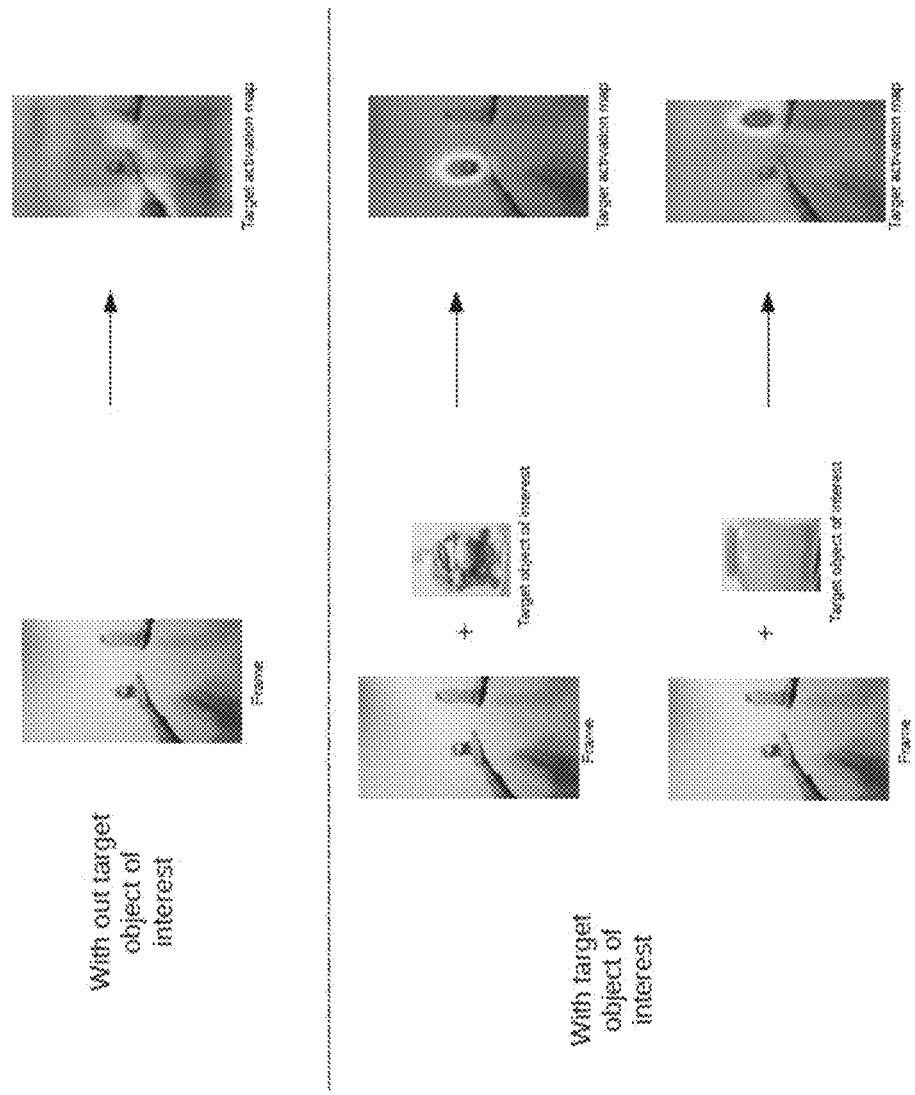
FIG. 7 depicts a comparison for target activation map generation for two scenarios in accordance with an example embodiment of the present disclosure.

FIG. 7, with reference to FIGS. 1 through 6B, depicts a comparison for target activation map generation for two scenarios in accordance with an example embodiment of the present disclosure. More specifically, FIG. 7 depicts a comparison of target activation map generation between a first scenario (upper portion) wherein only a frame is fed as an input to a system which typically can be realized in conventional systems and methods and a second scenario (lower portion) wherein target object of interest and frame both are provided as inputs to the proposed system that is realized by embodiments of the present disclosure. As can be seen from FIG. 7 that in the second scenario the output resulted is better and efficient in estimating position of the target when compared with the first scenario.

Figure 8:
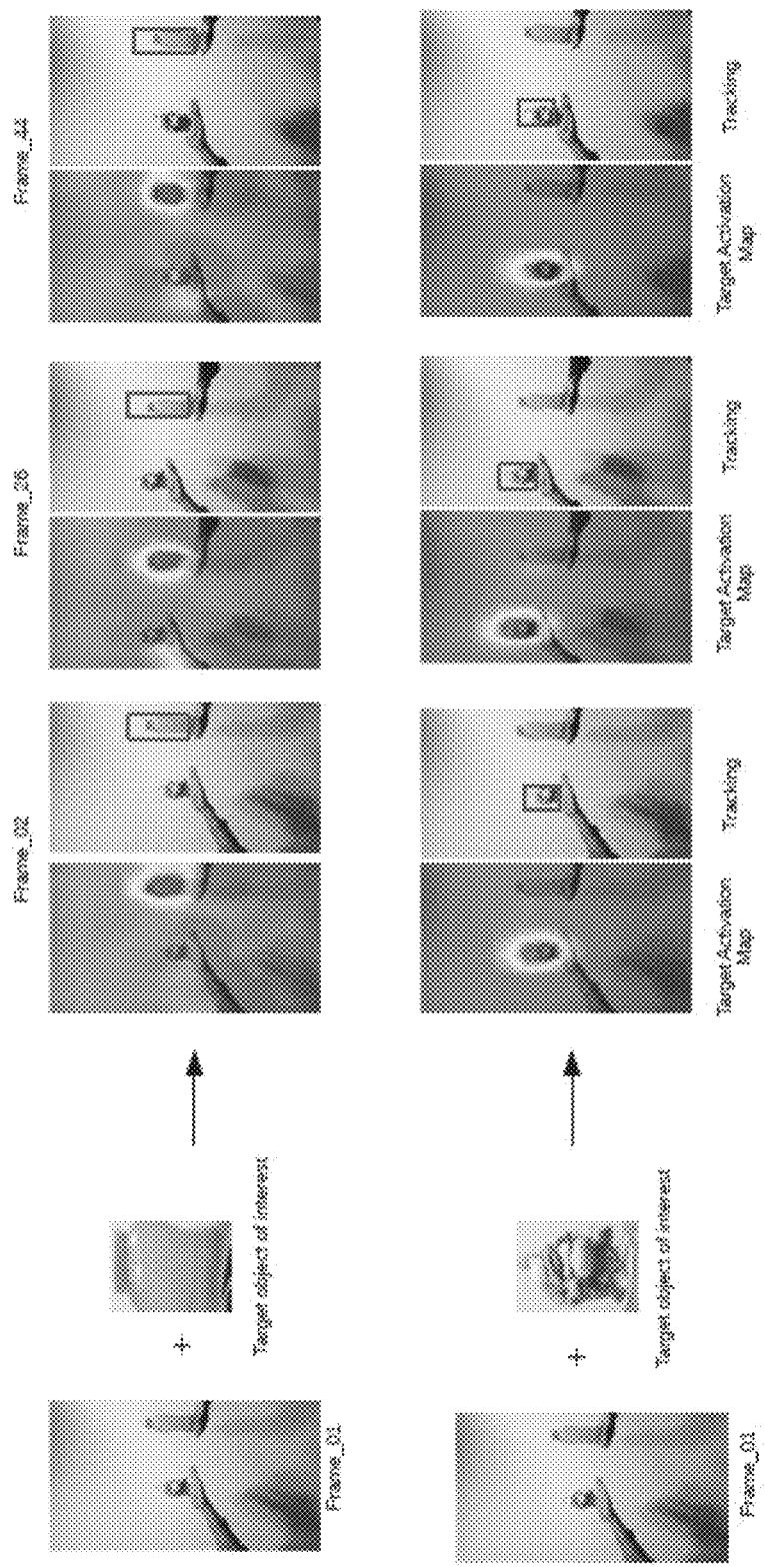
FIG. 8 depicts estimating position of target object of interest in successive frame when the target object of interest and full frame is provided as input to the system of FIG. 1 in accordance with an embodiment of the present disclosure.

FIG. 8, with reference to FIGS. 1 through 7, depicts estimating position of target object of interest in successive frames when the target object of interest and full frame is provided as input to the system 100 of FIG. 1 in accordance with an embodiment of the present disclosure.

Figures 9A, 9B:
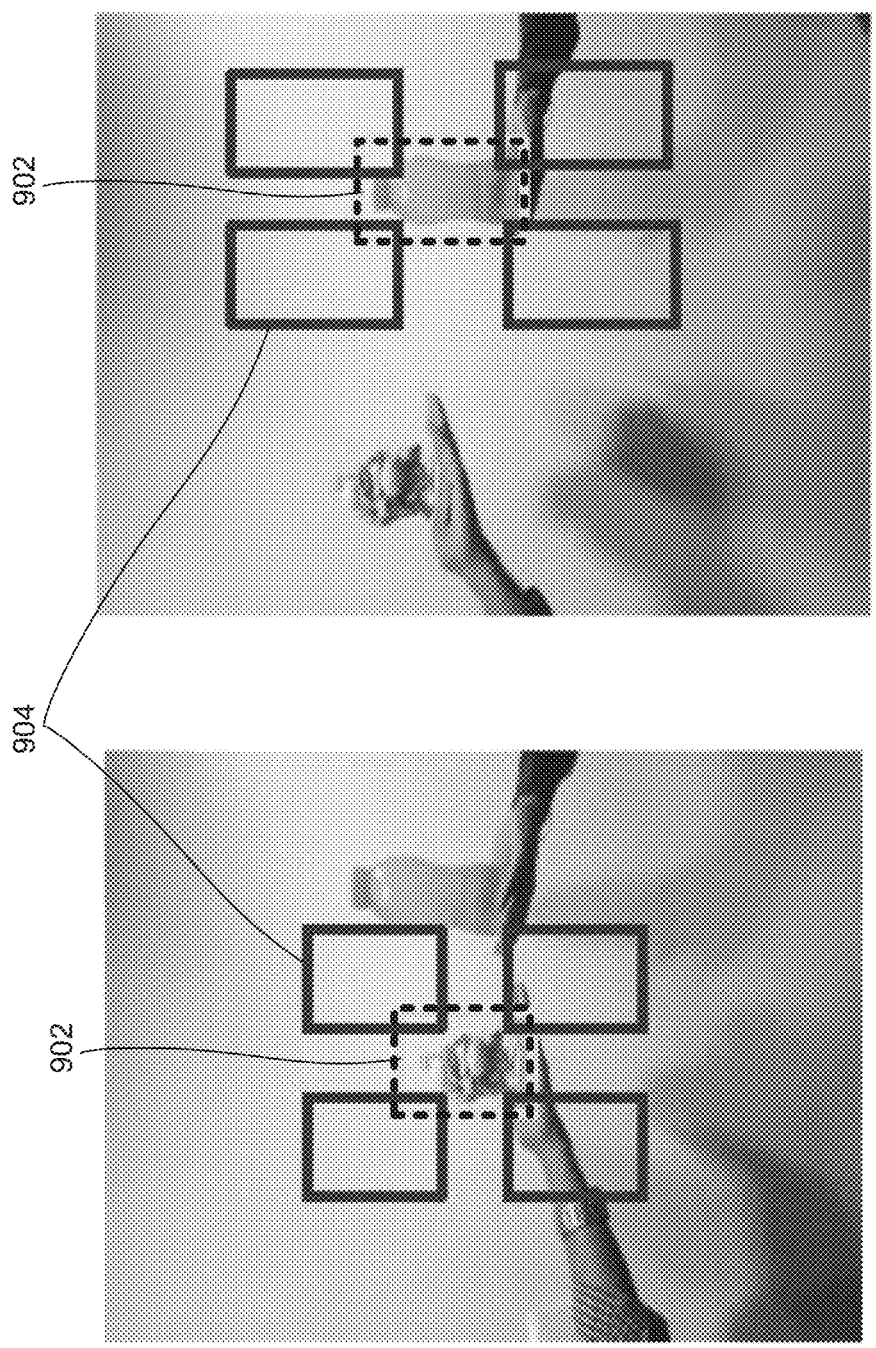
FIGS. 9A-9B depict identification and extraction of target and non-target patches for position estimation of target object of interest in video frames in accordance with an embodiment of the present disclosure.

FIGS. 9A-9B, with reference to FIGS. 1 through 8, depict identification and extraction of target and non-target patches for position estimation of target object of interest in video frames in accordance with an embodiment of the present disclosure. More particularly, FIGS. 9A-9B depict extraction of one or more patches of interest from one or more neighborhood of the identified tentative location of the target object of interest in the target activation maps. The one or more patches comprise, but are not limited to one or more positive patches (or patches indicative of target object of interest) as represented by a region with dash (dotted) line blocks 902 as depicted in FIGS. 9A-9B), one or more negative patches (or patches indicative of non-target objects) represented by a region with black solid line blocks 904 as depicted in FIGS. 9A-9B), or combinations thereof, in an example embodiment.

Figure 10:
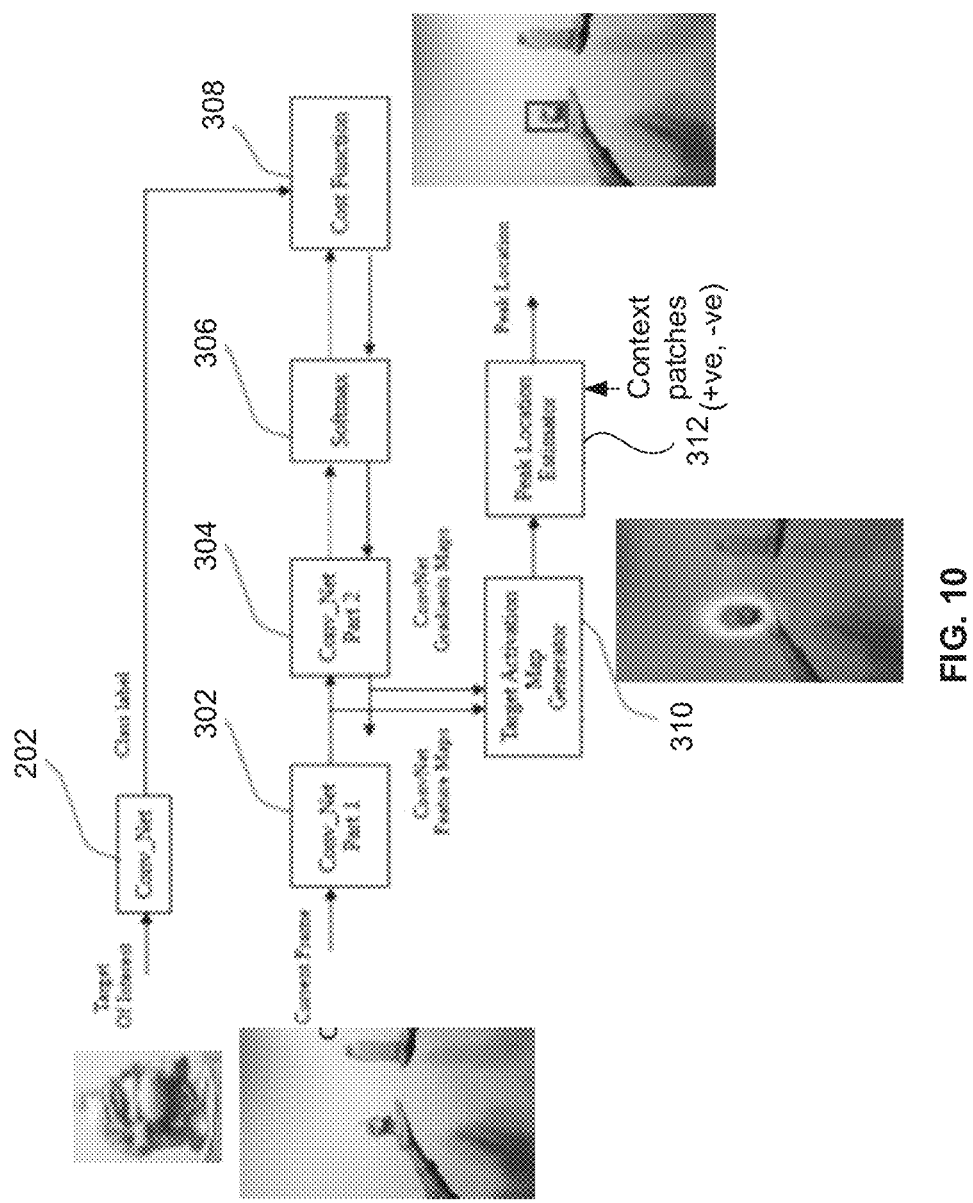
FIG. 10 depicts an output generated by the system of FIG. 1 using one or more components of FIGS. 2-4 in accordance with an embodiment of the present disclosure.

FIG. 10, with reference to FIGS. 1 through 9, depicts an output generated by the system 100 of FIG. 1 using one or more components of FIGS. 2-4 in accordance with an embodiment of the present disclosure. As can be seen from FIG. 9 that a full video frame (e.g., a first input) and a target object of interest patch (second input) is fed to the neural network 202 of the system 100 to generate an output comprising position estimation of the target object of interest (e.g., in this case an idol/statue (being held by a user) which is a target object of interest).

Embodiments of the present disclosure enable faster effective position estimation of target object of interest as the system 100 eliminates the need of computing class label for every frame as is the requirement in conventional systems and methods. Since the parameters of the neural network are continually updated after every frame being processed, this allows the system 100 and/or the neural network 202 to learn new variations (being determined) pertaining to the target. Moreover, as discussed above, existing conventional systems and methods may face challenges to locate the target when the target is moving at higher speeds as they locate target from the patch of interest rather that from whole frame. This is overcome by the embodiments of the present disclosure and its systems and methods by providing both the target object of interest, and frame both as an input while the system 100 is trained with class labels (e.g., target class labels) and non-class labels (e.g., non-target class labels).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   receiving, at a two-class neural network (202), a target of interest from a frame of a video to generate a score and a class label, wherein the score and class label are generated using a classifier of the two-class neural network, the classifier comprising a first class, and a second class, wherein the first class is specific to one or more targets and the second class is specific to one or more non-targets;
   receiving, at a first part of the two-class neural network, a subsequent frame of the video to generate one or more convolutional feature maps;
   computing, by a cost function, a cost value based on the class label and the score, wherein the cost value is computed at the first part of the neural network, a second part of the neural network, and a softmax layer of the neural network, and wherein the cost value is associated with each of the generated one or more convolutional feature maps;
   computing one or more gradient maps based on the score, the class label specific to the frame and the generated one or more convolutional feature maps, wherein the one or more gradient maps are computed for each frame until a last frame of the video using the class label specific to the frame that is computed using the two-class neural network;
   generating, one or more target activation maps, using the one or more gradient maps and the generated one or more convolutional feature maps;
   identifying, a tentative location of the target of interest based on the one or more target activation maps, and context associated thereof; and
   estimating, by using a peak location estimator, a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video.

2. The processor implemented method of claim 1, wherein the step of computing one or more gradient maps comprises performing a derivation on the cost value associated with each of the generated one or more convolutional feature maps.

3. The processor implemented method of claim 1, wherein the step of generating, one or more target activation maps comprises:
   up-sampling the generated one or more convolutional feature maps to an input image size;
   performing a pooling over each of the one more gradient maps to generate a real value ($\alpha$) from each of the one or more gradient maps; and
   generating the one or more target activation maps based on the set of real values and the up-sampled one or more convolutional feature maps.

4. The processor implemented method of claim 1, wherein the step of estimating, by using a peak location estimator, a position of the target using the tentative location comprises:
   extracting one or more patches from neighborhood of a tentative location in the one or more target activation maps;
   computing, by using a pre-trained correlation filter, a correlation map based on the extracted patch; and
   estimating the position of the target based on the correlation map.

5. The processor implemented method of claim 1, further comprising continually updating one or more parameters of a correlation filter of the two-class neural network based on at least one of the context associated with the target of interest, and view and change in position of the target of interest in one or more frames of the video.

6. A system (100), comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
   receive, at a two-class neural network (202), a target of interest from a frame of a video to generate a score and a class label, wherein the score and a class label are generated using a classifier of the two-class neural network, the classifier comprising a first class, and a second class, wherein the first class is specific to one or more targets and the second class is specific to one or more non-targets;

receive, at a first part (302) of the neural network (202), a subsequent frame of the video to generate one or more convolutional feature maps;

compute, by a cost function (308), a cost value based on the class label and the score, wherein the cost value is computed at the first part (302) of the neural network, a second part (304) of the neural network, and a softmax layer (306) of the neural network, and wherein the cost value is associated with each of the generated one or more convolutional feature maps;

compute one or more gradient maps based on the score, the class label specific to the frame and the generated one or more convolutional feature maps;

generate, via a target activation map generator (310) one or more target activation maps, using the one or more gradient maps and the generated one or more convolutional feature maps;

identify, a tentative location of the target of interest based on the one or more target activation maps, and context associated thereof; and estimate, by using a peak location estimator (312), a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video.

7. The system of claim 6, wherein the one or more gradient maps are computed by performing a derivation on the cost value associated with each of the generated one or more convolutional feature maps.

8. The system of claim 6, wherein the one or more target activation maps are generated by:
up-sampling the generated one or more convolutional feature maps to an input image size;
performing a pooling over each of the one more gradient maps to generate a real value ($\alpha$) from each of the one or more gradient maps; and
generating the one or more target activation maps based on the set of real values and the up-sampled one or more convolutional feature maps.

9. The system of claim 6, wherein the position of the target is estimated using the tentative location by:
extracting one or more patches from neighborhood of a tentative location in the one or more target activation maps;
computing, by using a pre-trained correlation filter (504), a correlation map based on the extracted patch; and
estimating the position of the target based on the correlation map.

10. The system of claim 6, wherein the one or more hardware processors (104) are further configured by the instructions to: continually update one or more parameters of a correlation filter of the two-class neural network based on at least one of the context associated with the target of interest, and view and change in position of the target of interest in one or more frames of the video.

11. One or more non-transitory machine readable information storage mediums comprising one or more instructions which when executed by one or more hardware processors cause:
receiving, at a two-class neural network (202), a target of interest from a frame of a video to generate a score and a class label, wherein the score and class label are generated using a classifier of the two-class neural network, the classifier comprising a first class, and a second class, wherein the first class is specific to one or more targets and the second class is specific to one or more non-targets;
receiving, at a first part of the two-class neural network, a subsequent frame of the video to generate one or more convolutional feature maps;
computing, by a cost function, a cost value based on the class label and the score, wherein the cost value is computed at the first part of the neural network, a second part of the neural network, and a softmax layer of the neural network, and wherein the cost value is associated with each of the generated one or more convolutional feature maps;
computing one or more gradient maps based on the score, the class label specific to the frame and the generated one or more convolutional feature maps, wherein the one or more gradient maps are computed for each frame until a last frame of the video using the class label specific to the frame that is computed using the two-class neural network;
generating, one or more target activation maps, using the one or more gradient maps and the generated one or more convolutional feature maps;
identifying, a tentative location of the target of interest based on the one or more target activation maps, and context associated thereof; and
estimating, by using a peak location estimator, a position of the target of interest in the video using the tentative location and the identified context, wherein one or more parameters of the neural network are continually updated upon processing each frame from the video to determine one or more variations specific to the target of interest, and wherein the one or more parameters are updated based on the one or more targets and the one or more non-targets being identified in each frame of the video.

12. The one or more non-transitory machine readable information storage mediums of claim 11, wherein the step of computing one or more gradient maps comprises performing a derivation on the cost value associated with each of the generated one or more convolutional feature maps.

13. The one or more non-transitory machine readable information storage mediums of claim 11, wherein the step of generating, one or more target activation maps comprises:
up-sampling the generated one or more convolutional feature maps to an input image size;
performing a pooling over each of the one more gradient maps to generate a real value ($\alpha$) from each of the one or more gradient maps; and
generating the one or more target activation maps based on the set of real values and the up-sampled one or more convolutional feature maps.

14. The one or more non-transitory machine readable information storage mediums of claim 11, wherein the step of estimating, by using a peak location estimator, a position of the target using the tentative location comprises:

extracting one or more patches from neighborhood of a tentative location in the one or more target activation maps;

computing, by using a pre-trained correlation filter, a correlation map based on the extracted patch; and estimating the position of the target based on the correlation map.

15. The one or more non-transitory machine readable information storage mediums of claim 11, wherein the instructions which when executed by the one or more hardware processors further cause continually updating one or more parameters of a correlation filter of the two-class neural network based on at least one of the context associated with the target of interest, and view and change in position of the target of interest in one or more frames of the video.

* * * * *